(12) United States Patent
Kuroki et al.

(10) Patent No.: US 9,598,082 B2
(45) Date of Patent: Mar. 21, 2017

(54) COASTING CONTROL DEVICE AND METHOD FOR VEHICLE

(71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 15 days.

(21) Appl. No.: 14/413,340

(22) PCT Filed: Oct. 21, 2013

(86) PCT No.: PCT/IB2013/002569
§ 371 (c)(1),
(2) Date: Jan. 7, 2015

(87) PCT Pub. No.: WO2014/064524
PCT Pub. Date: May 1, 2014

(65) Prior Publication Data
US 2015/0166065 A1 Jun. 18, 2015

(30) Foreign Application Priority Data

Oct. 24, 2012 (JP) ................................. 2012-235025

(51) Int. Cl.
*B60W 10/02* (2006.01)
*B60W 30/18* (2012.01)
(Continued)

(52) U.S. Cl.
CPC ..... *B60W 30/18072* (2013.01); *B60T 13/662* (2013.01); *B60W 10/02* (2013.01);
(Continued)

(58) Field of Classification Search
CPC .... B60W 10/02; B60W 10/06; B60W 10/184; B60W 30/18072;
(Continued)

(56) References Cited

U.S. PATENT DOCUMENTS 4,842,113 A * 6/1989 Lutz ..................... B60W 10/06
477/73
5,961,418 A 10/1999 Taniguchi et al.
(Continued)

FOREIGN PATENT DOCUMENTS

JP 10181388 A 7/1998
JP 2002-227885 A 8/2002
(Continued)

OTHER PUBLICATIONS

Communication dated Apr. 8, 2016 from the United States Patent Office in counterpart U.S. Appl. No. 14/414,593.
(Continued)

*Primary Examiner* — Ramya Burgess
*Assistant Examiner* — David Morris
(74) *Attorney, Agent, or Firm* — Sughrue Mion, PLLC

(57) ABSTRACT

In consideration of an amplification effect of a braking force at the time of brake operation, upper-limits ($\alpha$, $\beta$) of a brake
(Continued)

operation force (Brk) with which the execution of free-run coasting and neutral coasting is started may be different, on the basis of whether or not a brake booster can be filled with a negative pressure. Therefore, while the braking force at the time of brake operation is secured, the range of the brake operation force (Brk) with which coasting is executed can be enlarged, and an improvement in fuel economy can be made.

4 Claims, 6 Drawing Sheets

(51) Int. Cl.
| | |
|---|---|
| *B60W 10/06* | (2006.01) |
| *B60W 10/184* | (2012.01) |
| *B60W 10/188* | (2012.01) |
| *B60W 10/30* | (2006.01) |
| *B60T 13/66* | (2006.01) |
| *F02D 41/12* | (2006.01) |

(52) U.S. Cl.
CPC .......... *B60W 10/06* (2013.01); *B60W 10/184* (2013.01); *B60W 10/188* (2013.01); *B60W 10/30* (2013.01); *B60W 30/18136* (2013.01); *F02D 41/12* (2013.01); *B60T 2201/04* (2013.01); *B60W 2030/1809* (2013.01); *B60W 2030/18081* (2013.01); *B60W 2510/244* (2013.01); *B60W 2520/10* (2013.01); *B60W 2540/10* (2013.01); *B60W 2540/12* (2013.01); *B60W 2550/142* (2013.01); *B60W 2710/182* (2013.01); *F02D 2200/602* (2013.01); *F02D 2250/41* (2013.01); *Y10T 477/814* (2015.01)

(58) Field of Classification Search
CPC ... B60W 2030/18081; B60W 30/1809; B60W 30/18109; B60W 30/18127; B60W 30/18136; B60W 2510/18; B60W 2550/142; B60W 2540/12
See application file for complete search history.

(56) References Cited

U.S. PATENT DOCUMENTS

| | | | |
|---|---|---|---|
| 6,754,579 B2* | 6/2004 | Kamiya | B60W 10/06 477/203 |
| 8,394,001 B2 | 3/2013 | Tsutsui et al. | |
| 2007/0102208 A1 | 5/2007 | Okuda et al. | |
| 2011/0245005 A1 | 10/2011 | Tsutsui et al. | |
| 2011/0256980 A1* | 10/2011 | Saito | B60W 10/06 477/183 |
| 2011/0270501 A1 | 11/2011 | Ito et al. | |
| 2012/0010047 A1* | 1/2012 | Strengert | B60W 10/02 477/171 |
| 2013/0066493 A1* | 3/2013 | Martin | B60W 30/18136 701/22 |
| 2015/0006045 A1 | 1/2015 | Motozono et al. | |
| 2015/0149058 A1 | 5/2015 | Kim et al. | |
| 2015/0191172 A1 | 7/2015 | Kim | |
| 2015/0274168 A1 | 10/2015 | Kuroki et al. | |
| 2015/0291171 A1 | 10/2015 | Kuroki et al. | |
| 2015/0307103 A1 | 10/2015 | Kuroki et al. | |
| 2016/0084376 A1 | 3/2016 | Kim et al. | |

FOREIGN PATENT DOCUMENTS

| | | |
|---|---|---|
| JP | 2005226701 A | 8/2005 |
| JP | 2012-047054 A | 3/2012 |
| JP | 2012-149710 A | 8/2012 |
| WO | 2011/135725 A1 | 11/2011 |

OTHER PUBLICATIONS

Communication dated Nov. 10, 2016 from U.S. Patent & Trademark Office in U.S. Appl. No. 14/414,593.

\* cited by examiner

| TRAV-ELLING MODE | ENGINE 12 | CLUTCH C1 | ENGINE BRAKE FORCE | FUEL ECONOMY | SUPPLY OF NEGATIVE PRESSURE | CHARGE OF BATTERY |
|---|---|---|---|---|---|---|
| NORMAL TRAV-ELLING | DRIVING / DRIVEN | ENGAGED | LARGE | — | ○ | ○ |
| FREE-RUN COASTING | F/C/ STOPPED FROM ROTATING | RELEASED | SMALL | ◎ | × | × |
| NEUTRAL COASTING | IDLY ROTATED | RELEASED | SMALL | ○ | ○ | ○ |

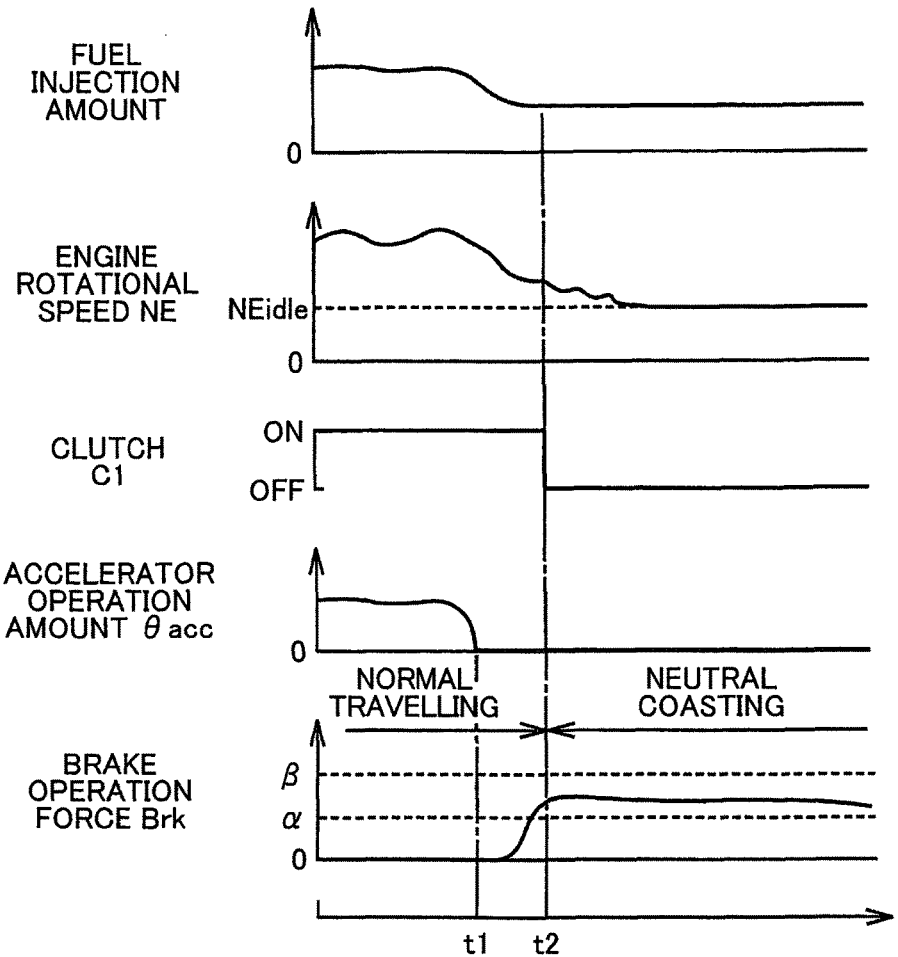

COASTING CONTROL DEVICE AND METHOD FOR VEHICLE

BACKGROUND OF THE INVENTION

1. Field of the Invention

The invention relates to a control device and a control method for a vehicle, and more particularly, to an art of making a further improvement in fuel economy while securing an amplification effect of a braking force at the time of brake operation in a vehicle that can coast, namely, travel (run) with an engine brake force made smaller than during engine brake travelling.

2. Description of Related Art

For engine brake travelling during which an engine and wheels are connected together and a vehicle runs with engine brake effectuated through driven rotation of the engine, with a view to making an improvement in fuel economy by prolonging the travel distance, coasting during which the vehicle runs with an engine brake force made smaller than during the engine brake travelling has been conceived. A device described in Japanese Patent Application Publication No. 2002-227885 (JP-A-2002-227885) is such an example. There have been proposed two control modes, namely, (a) first coasting during which the vehicle runs with the engine stopped from rotating and (b) second coasting during which the vehicle runs with the engine allowed to rotate. Specifically, first coasting is free-run coasting during which a clutch is released to disconnect the engine from the wheels and the supply of fuel to the engine is stopped so that the engine is stopped from rotating. Second coasting is neutral coasting during which the clutch is released to disconnect the engine from the wheels and fuel is supplied to the engine so that the engine is operated (autonomously rotated). Then, this first coasting and this second coasting are not distinguished from each other in particular, and one of them is executed under a certain condition.

By the way, in the aforementioned Japanese Patent Application Publication No. 2002-227885 (JP 2002-227885 A), if the operation amount of a brake pedal, namely, a brake requirement amount becomes equal to or larger than a predetermined value, the control mode of coasting is canceled without distinguishing the aforementioned two kinds of coasting from each other. That is, the operation of the brake pedal means a driver's requirement for deceleration. Therefore, if the brake requirement amount is large, coasting is cancelled to make a recovery to engine brake travelling during which a larger engine brake force is obtained. Besides, if the brake requirement amount is equal to or larger than a predetermined value as in this case, the control mode of coasting cannot be entered.

SUMMARY OF THE INVENTION

There is a difference in the performance of a brake between first coasting and second coasting that are different in the state of an engine from each other. However, in Japanese Patent Application Publication No. 2002-227885 (JP-2002-227885 A), first coasting and second coasting are executed without being distinguished from each other, and there is still a room of improvement in making an improvement in fuel economy while securing the brake force at the time of brake operation. That is, a vehicle is generally equipped with a brake booster that amplifies a brake force through the use of a negative pressure generated through rotation of the engine. However, in first coasting during which the engine is stopped from rotating, the brake booster cannot be filled with a negative pressure, and the amplification effect of the brake force may deteriorate through repeated operation of the brake. On the other hand, in second coasting during which the engine is allowed to rotate, the brake booster is successively filled with a negative pressure, and hence the amplification effect of the brake force is continuously obtained. However, since the engine rotates and an engine loss is caused, fuel economy deteriorates in comparison with first coasting. In this manner, although first coasting and second coasting have different characteristics as to fuel economy and the braking force, it is not considered at all whether the engine should be rotated (second coasting) or stopped (first coasting) when coasting is executed in Japanese Patent Application Publication No. 2002-227885 (JP-2002-227885 A). This is incomplete as a condition for executing coasting from the standpoint of both fuel economy and the braking force.

The invention provides a control device for a vehicle and a control method for a vehicle that make a further improvement in fuel economy while securing an amplification effect of a braking force at the time of brake operation in a vehicle that can coast, namely, run (travel) with an engine brake force made smaller than during engine brake travelling.

A first aspect of the invention relates to a control device for a vehicle. The vehicle is equipped with an engine, a brake operation member that is operated on a basis of a driver's brake requirement amount, and a brake booster that amplifies a brake force with use of a negative pressure generated through rotation of the engine. The control device includes a controller. The controller is configured to execute engine connection travelling that allows to execute engine brake travelling during which the engine is connected to a wheel and is drivingly rotated through rotation of the wheel such that the vehicle travels with engine brake effectuated. The controller is configured to execute first coasting if the brake requirement amount is equal to or smaller than a predetermined first criterial value. The controller is configured to execute second coasting if the brake requirement amount is equal to or smaller than a predetermined second criterial value that is larger than the first criterial value. The controller is configured to set an engine brake force during the first coasting or the second coasting smaller than an engine brake force during the engine brake travelling. The controller is configured to stop the engine and cause the vehicle to travel during the first coasting. The controller is configured to rotate the engine and cause the vehicle to travel during the second coasting.

In this control device for the vehicle, the execution of first coasting during which the vehicle runs with the engine stopped from rotating is started on the condition that the brake requirement amount be equal to or smaller than the first criterial value. In this first coasting, the brake booster cannot be filled with a negative pressure, but the execution of first coasting is started only in a range where the brake requirement amount assumes a relatively small value that is equal to or smaller than the first criterial value. Therefore, the negative pressure of the brake booster is restrained from falling, and while a vehicle braking force resulting from brake operation is secured, first coasting is executed and the engine is stopped from rotating until the brake requirement amount reaches the first criterial value. Thus, an excellent performance of making an improvement in fuel economy is obtained.

On the other hand, the execution of second coasting during which the vehicle runs with the engine allowed to rotate is started on the condition that the brake requirement amount assume a relatively large value that is equal to or smaller than the second criterial value. Therefore, an amplification effect of the brake force by the brake booster is appropriately obtained through rotation of the engine. While a vehicle braking force resulting from brake operation is secured, more excellent fuel economy than during engine brake travelling is obtained.

That is, if the upper-limits (the first criterial value and the second criterial value) of the brake requirement amount at which first coasting and second coasting are executed respectively are uniformly increased attaching importance to fuel economy, the amplification effect of the braking force at the time of brake operation may deteriorate during first coasting during which the engine is stopped from rotating. On the contrary, if the upper-limits (the first criterial value and the second criterial value) of the brake requirement amount at which first coasting and second coasting are executed respectively are uniformly reduced attaching importance to the amplification effect of the braking force, the execution range of coasting becomes too narrow to obtain sufficient performance of making an improvement in fuel economy in second coasting during which the engine is rotated, despite the fact that the brake booster is successively filled with a negative pressure and the amplification effect of the braking force is appropriately maintained. In contrast, in the invention of the present application, in consideration of the amplification effect of the braking force at the time of brake operation, there is provided a difference between the upper-limits of the brake requirement amount at which the execution of first coasting and the execution of second coasting are started respectively, on the basis of whether or not the brake booster can be filled with a negative pressure. Therefore, while a vehicle braking force resulting from brake operation is secured, the range of the brake requirement amount in which coasting is executed is enlarged, so that a further improvement in fuel economy can be made.

In the aforementioned control device, the controller may be configured to stop supplying fuel to the engine and drivingly rotate the engine in accordance with a vehicle speed during the engine brake travelling at a time of the engine connection travelling. The controller may be configured to execute the engine brake travelling if the brake requirement amount exceeds the second criterial value.

In the control device, engine brake travelling during which fuel is stopped from being supplied and a large engine brake force is obtained can also be executed in the range where the brake requirement amount has exceeded the second criterial value. Therefore, engine brake travelling is executed especially in the case where the driver's brake requirement amount is large. Thus, a large engine brake force is obtained in addition to the amplification effect of the brake force resulting from the brake booster, and a large braking force is obtained through brake operation. During coasting, the maximum value of the braking force that can be generated by the vehicle as a whole decreases correspondingly to a decrease in engine brake force, but a sufficient braking force is secured through a changeover to engine brake travelling.

In the aforementioned control device, the controller may be configured to set the first criterial value and the second criterial value in accordance with a gradient of a road surface. The controller may be configured to set the first criterial value and the second criterial value in a case where the road surface is a downhill gradient smaller than the first criterial value and the second criterial value in a case where the road surface is a flat road, respectively.

In the control device, the first criterial value and the second criterial value are both made smaller in the case of a downhill gradient than in the case of a flat road (a substantially horizontal road surface). Therefore, the execution range of first coasting during which the brake booster cannot be filled with a negative pressure becomes narrow, and the execution range of second coasting during which the engine brake force is small becomes narrow. Thus, the range of engine brake travelling during which a large brake force is obtained is enlarged correspondingly. Therefore, a large vehicle braking force can be secured on a downhill gradient.

In the aforementioned control device, the controller may be configured to set the first criterial value and the second criterial value in accordance with a gradient of a road surface. The controller may be configured to set the first criterial value and the second criterial value in a case where the road surface is an uphill gradient larger than the first criterial value and the second criterial value in a case where the road surface is a flat road, respectively.

In the control device, the first criterial value and the second value are both made larger in the case of an uphill gradient than in the case of a flat road (a substantially horizontal road surface), but the requirement for the braking force is relatively small on the uphill gradient. Therefore, while a vehicle braking force resulting from brake operation is secured, the travel distance resulting from first coasting or second coasting is prolonged, so that a further improvement in fuel economy is made.

In the aforementioned control device, the controller may be configured to make a transition to the second coasting if the brake requirement amount has exceeded the first criterial value during execution of the first coasting. The controller may be configured to make a transition to the engine connection travelling if the brake requirement amount has exceeded the second criterial value during execution of the second coasting.

The control device makes it possible to obtain an amplification effect of a brake force resulting from the brake booster in accordance with the brake requirement amount, and further to obtain a large engine brake force resulting from engine brake travelling, in a case where a transition to second coasting is made if the brake requirement amount has exceeded the first criterial value during first coasting, and where a recovery to engine connection travelling is made if the brake requirement amount has exceeded the second criterial value during second coasting. Thus, while a braking force at the time of brake operation is appropriately secured, first coasting is executed if the brake requirement amount is equal to or smaller than the first criterial value, and second coasting is executed if the brake requirement amount has exceeded the first criterial value to become equal to or smaller than the second criterial value. Thus, an excellent performance of making an improvement in fuel economy is obtained.

In the aforementioned control device, the first coasting may be coasting (free-run coasting) during which the engine is disconnected from the wheel and fuel is stopped from being supplied to the engine such that the engine is stopped, and the second coasting may be coasting (neutral coasting) during which the engine is disconnected from the wheel and fuel is supplied to the engine such that the engine is operated.

In the control device, free-run coasting is executed as first coasting, and neutral coasting is executed as second coasting. Therefore, the engine brake force is smaller and the travel distance resulting from coasting is longer than during engine brake travelling, and an improvement in fuel economy can be made.

In the aforementioned neutral coasting, the engine is operated (autonomously rotated) by being supplied with fuel. Therefore, fuel economy deteriorates correspondingly in comparison with free-run coasting, but since the engine is disconnected from the wheel, the engine brake force is substantially 0, the travel distance resulting from coasting becomes long, and the frequency of re-acceleration becomes low. Therefore, an improvement in fuel economy can be made as a whole in comparison with engine brake travelling.

In the aforementioned control device, the first coasting may be coasting (free-run coasting) during which the engine is disconnected from the wheel and fuel is stopped from being supplied to the engine such that the engine is stopped, and the second coasting may be coasting (cylinder stop coasting) during which the engine and the wheel are disconnected to each other, fuel is stopped from being supplied to the engine, and at least one of operation of a piston or pistons and operation of intake and exhaust valves in at least one of a plurality of cylinders of the engine is stopped.

In the control device, free-run coasting is executed as first coasting, and cylinder stop coasting is executed as second coasting. Therefore, the engine brake force is smaller than during engine brake travelling. Thus, the travel distance resulting from coasting becomes long, and an improvement in fuel economy can be made.

In the aforementioned cylinder stop coasting, a crankshaft is rotated to be driven in accordance with a vehicle speed or the like. However, in the case where the piston is stopped or the pistons are stopped, the engine brake force is reduced correspondingly to the lack of a loss (a rotational resistance) caused by a pumping effect. Besides, in the case where the intake and exhaust valves are stopped in their closed or open states as well, the loss caused by the pumping loss is smaller than in the case where the intake and exhaust valves are opened/closed in synchronization with the crankshaft, so that the engine brake force is reduced.

Besides, only one or some of the plurality of the cylinders of the engine are stopped, and the remaining cylinders or the remaining cylinder is opened/closed in synchronization with the crankshaft. Therefore, a negative pressure is supplied to the brake booster through the pumping effect by the cylinder or the cylinders, and the brake force can be amplified.

A second aspect of the invention relates to a control method for a vehicle. The vehicle includes an engine, a brake operation member that is operated on a basis of a driver's brake requirement amount, and a brake booster that amplifies a brake force with use of a negative pressure generated through rotation of the engine. The control method includes executing engine connection travelling that allows to execute engine brake travelling during which the engine is connected to a wheel and is drivingly rotated through rotation of the wheel such that the vehicle travels with engine brake effectuated, executing first coasting if the brake requirement amount is equal to or smaller than a predetermined first criterial value, executing second coasting if the brake requirement amount is equal to or smaller than a predetermined second criterial value that is larger than the first criterial value, setting an engine brake force during the first coasting or the second coasting smaller than an engine brake force during the engine brake travelling, stopping the engine and causing the vehicle to travel during the first coasting, and rotating the engine and causing the vehicle to travel during the second coasting.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is an example of a time chart showing changes in operation state of the respective portions in a case where the execution of neutral coasting is started according to the flowchart of FIG. 5; and FIG. 8 is a view illustrating the other embodiment of the invention, and is a view illustrating three travelling modes that are executed by the vehicular drive unit of FIG. 1.

DETAILED DESCRIPTION OF EMBODIMENTS

Figure 1:
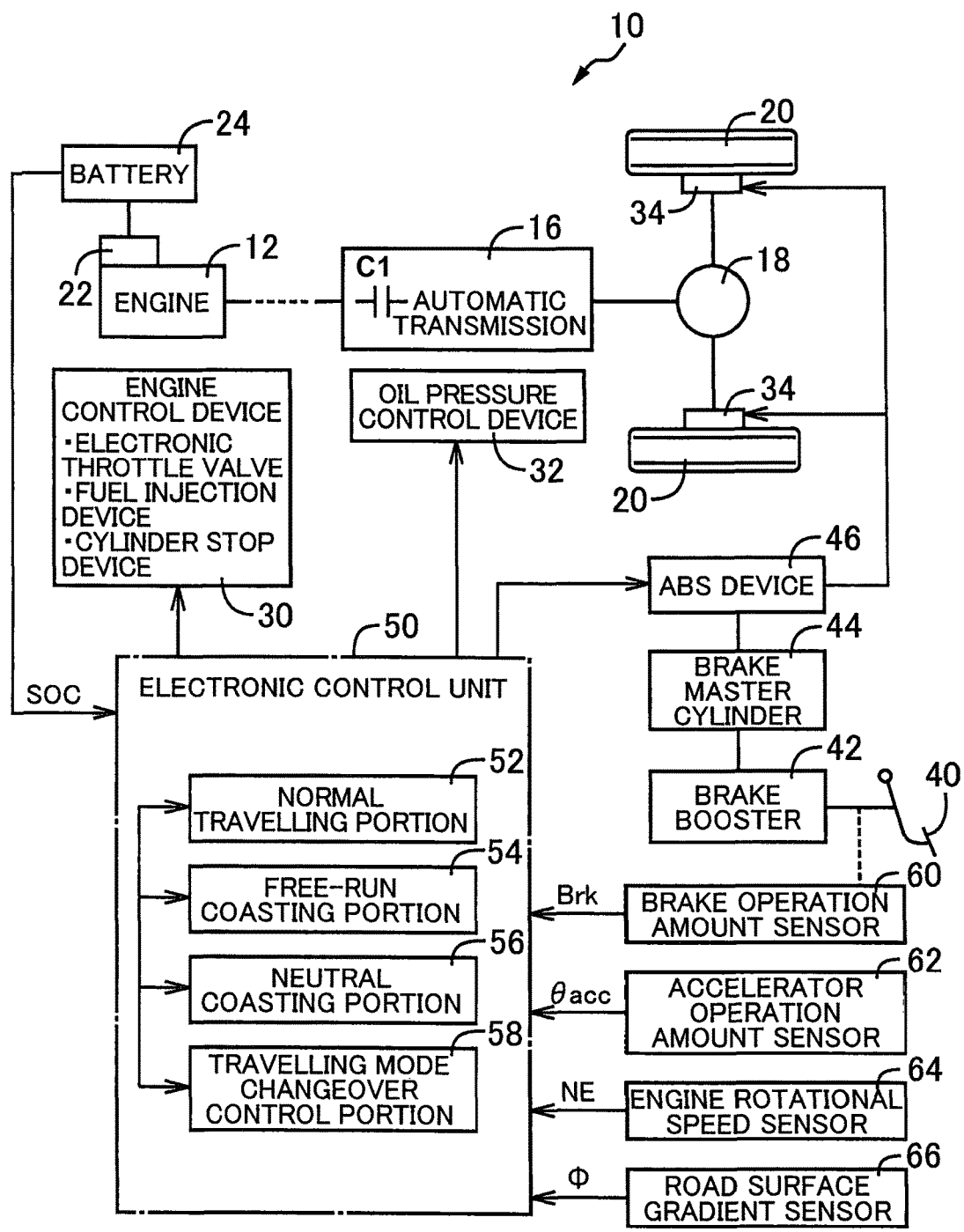
FIG. 1 is a schematic block diagram showing an essential part of a control system according to one of the embodiments to which the invention is preferably applied, as well as a skeleton diagram of a vehicular drive unit according to the embodiment of the invention.

The invention is applied to a vehicle that is equipped with at least an engine as a driving force source, and is preferably applied to an engine-driven vehicle. However, the invention is also applicable to a hybrid vehicle that is equipped with an electric motor and a motor-generator as well as an engine as driving force sources, or the like. The engine is an internal combustion engine or the like that generates a motive power through the combustion of fuel, or the like. A brake operation member that is operated by a driver in accordance with a brake requirement amount is, for example, a brake pedal that is operated through depression by a foot of the driver, and the brake requirement amount is a depression operation force, a depression stroke or the like. A brake hydraulic pressure or the like that is generated via a brake booster through mechanical or electric control in a manner corresponding to the brake requirement amount can also be used as the brake requirement amount.

A disconnection/connection device that connects/disconnects the engine and wheels to/from one another is disposed between the engine and the wheels, and is configured such that the engine can be disconnected from the wheels. As the disconnection/connection device, a frictional engagement clutch or brake is preferably used, but various disconnection/connection devices can be adopted. For example, the transmission of motive power can also be connected/disconnected through electric control of a reactive force. An automatic transmission that is equipped with a plurality of clutches and brakes and that can establish a neutral range can also be utilized.

During engine brake travelling at the time of engine connection travelling, all cylinders of the engine are rotated to be driven, so that an engine brake force is generated by a rotational resistance such as a pumping loss, a friction torque or the like. The engine is desired to be in a fuel-cut (F/C) state in which the supply of fuel is stopped. However, the engine may also be in an operation state in which a predetermined amount of fuel is supplied, such as an idle state or the like. Even in the case of the idle state, all the cylinders of the engine are rotated to be driven at a rotational speed corresponding to a vehicle speed or the like, so that an engine brake force is generated.

First coasting is free-run coasting during which the engine is disconnected from the wheels by, for example, the disconnection/connection device and the supply of fuel to the engine is stopped to stop the engine from rotating, or the like. Besides, second coasting is neutral coasting during which the engine is supplied with fuel to be operated (autonomously rotated) in a state of being disconnected from the wheels by, for example, the disconnection/connection device, cylinder stop coasting during which the supply of fuel to the engine is stopped while the engine and the wheels are connected together by the disconnection/connection device and at least one of the operation of the piston or the pistons and the operation of the intake and exhaust valves in one or some of the plurality of the cylinders is stopped, or the like. The pistons and the intake and exhaust valves can be mechanically stopped by, for example, disconnecting a clutch mechanism that is disposed between them and the crankshaft. For example, in the case where the intake and exhaust valves of an electromagnetic type or the like, which can be controlled to be opened/closed independently of rotation of the crankshaft, are used, it is acceptable to stop the operation of the intake and exhaust valves. For example, positions at which both the intake and exhaust valves are closed are suitable as stop positions of the intake and exhaust valves. However, the stop positions of the intake and exhaust valves are appropriately determined. The intake and exhaust valves may be stopped, for example, at positions where they are both open. The invention is also applicable to a case where both neutral coasting and cylinder stop coasting are executed as second coasting according to the classification of cases. In that case, the second criterial value may assume either the same value or a different value.

During the aforementioned second coasting, the vehicle runs (travels) with the engine allowed to rotate and with the engine brake force made smaller than during engine brake travelling, and a negative pressure can be supplied to the brake booster through rotation of the engine. Accordingly, the aforementioned cylinder stop coasting is configured such that one or some of the plurality of the cylinders are stopped and the piston or the piston and the intake and exhaust valves in the remaining cylinders or the remaining cylinder are operated in synchronization with rotation of the crankshaft. For example, in the case of an eight-cylinder engine, there is adopted a configuration in which only half a number of the cylinders, namely, four of the cylinders are stopped and the remaining four cylinders are operated, or a configuration in which only six of the cylinders are stopped and the remaining two cylinders are operated. Incidentally, in the case where all the cylinders are stopped to execute coasting, the amplification effect of the brake force by the brake booster deteriorates. Therefore, as is the case with first coasting, it is desirable to make an end at a relatively small brake requirement amount such as the first criterial value or the like, and make a recovery to engine brake travelling.

The invention relates to a determination on the start of execution of first coasting and second coasting, and the start condition of the determination includes the brake requirement amount, but is appropriately determined as, for example, a condition that the output requirement amount of an accelerator operation amount or the like be 0 (an accelerator be OFF), in addition to the brake requirement amount. The classification of cases in starting the execution of first coasting and second coasting is determined, for example, such that the execution of first coasting is started if the brake requirement amount is equal to or smaller than the first criterial value, and that the execution of second coasting is started if the brake requirement amount has exceeded the first criterial value to become equal to or smaller than the second criterial value. Besides, during second coasting, an electric power can be generated by an alternator through rotation of the engine. Therefore, if the remaining state of charge of a battery is equal to or smaller than a predetermined amount etc., it is acceptable to restrict the start of execution of first coasting in accordance with the necessity of electric energy, and execute second coasting even if the brake requirement amount is equal to or smaller than the first criterial value. If the negative pressure in a negative pressure tank of the brake booster (a brake negative pressure) is equal to or smaller than a predetermined value (close to an atmospheric pressure), the amplification effect of the brake force is not obtained. Therefore, it is also acceptable to execute second coasting even if the brake requirement amount is equal to or smaller than the first criterial value. The condition for starting the execution of each coasting or the condition that allows each coasting to be executed is appropriately determined in accordance with a vehicle state, a travelling state, or the like.

The end condition as a condition for ending the execution of the aforementioned first coasting and the aforementioned second coasting is appropriately determined. For example, it is acceptable to end the execution if the aforementioned execution start condition is unfulfilled. However, it is also possible to determine an end condition that is different from the execution start condition. For example, it is acceptable to continue first coasting and second coasting until the output requirement amount becomes equal to or larger than a predetermined value, even if the output requirement amount has changed from OFF to ON due to depression operation of an accelerator pedal. It is also acceptable to set the brake requirement amount to different values for the execution start condition and the end condition respectively, and the end condition may lack a condition regarding the brake requirement amount.

The supply of fuel may be stopped, and engine brake travelling may be executed. However, engine brake travelling can also be executed while operating the engine in a predetermined operation state in which a minimum amount of fuel is supplied, such as an idle state or the like. It is acceptable to execute engine brake travelling only in a range where the brake requirement amount has exceeded the second criterial value. However, engine brake travelling can also be executed in a range that is equal to or smaller than the second criterial value, namely, a range where first coasting and second coasting are executed. It is also acceptable to execute engine brake travelling in the case where the execution of first coasting or second coasting is impossible or inappropriate.

The aforementioned first criterial value and the aforementioned second criterial value may be set in accordance with the gradient of a road surface. However, the first criterial value and the second criterial value are not absolutely required to be set in accordance with the gradient, but may be constant values. The first criterial value and the second criterial value can also be variably set in accordance with a vehicle state or a travelling state, for example, a remaining state of charge of the battery or the like, instead of being set in accordance with the gradient of the road surface. It is also acceptable to make only one of the first criterial value and the second criterial value variable. In this variable setting, the criterial value may be continuously changed or changed stepwise, for example, in two stages, and is determined in advance by a data map, an arithmetic expression or the like.

A transition to second coasting may be made if the brake requirement amount has exceeded the first criterial value during the execution of first coasting. However, it is acceptable to make a recovery to engine connection travelling or make a transition to another travelling mode in which the engine is rotated. A transition from first coasting to second coasting is not always indispensable. It is acceptable to simply make such a transition under a certain condition.

The embodiments of the invention will be described hereinafter in detail with reference to the drawings. FIG. 1 is a schematic block diagram showing an essential part of a control system, as well as a skeleton diagram of a vehicular drive unit 10 to which the invention is preferably applied. The vehicular drive unit 10 is equipped, as a driving force source, with an engine 12 that is an internal combustion engine such as a gasoline engine, a diesel engine or the like, which generates a motive power through the combustion of fuel. An output of the engine 12 is transmitted from an automatic transmission 16 to right and left wheels 20 via a differential gear mechanism 18. A motive power transmission device such as a damper device, a torque converter or the like is provided between the engine 12 and the automatic transmission 16, but a motor-generator that functions as a driving force source can also be disposed.

An alternator 22 is connected to the engine 12 via a belt or the like. The alternator 22 generates an electric power by being rotated as the engine 12 rotates, thereby charging a battery 24. Besides, the vehicular drive unit 10 according to this embodiment of the invention is equipped with an antilock brake system (ABS) device 46 that electrically controls an oil pressure (a brake force) of wheel brakes 34 through the use of an electric power of the battery 24, and appropriately brakes the vehicle by, for example, restraining a slip (locking) of the wheels 20 at the time of brake operation by a driver.

The aforementioned engine 12 is equipped with an engine control device 30 having various instruments necessary for output control of the engine 12, such as an electronic throttle valve, a fuel injection device and the like, a cylinder stop device, and the like. The electronic throttle valve controls the amount of intake air, and the fuel injection device controls the supply amount of fuel, and is basically controlled in accordance with an operation amount of the accelerator pedal (an accelerator operation amount) θacc as an output requirement amount of the driver. Even during the travelling of the vehicle, the fuel injection device can stop the supply of fuel (carry out fuel cut F/C) when the accelerator is OFF, namely, when the accelerator operation amount θacc is 0, etc. The cylinder stop device can stop one, some or all of intake and exhaust valves of a plurality of cylinders, for example, eight cylinders or the like after mechanically disconnecting it or them from a crankshaft by a clutch mechanism or the like, and stops, for example, the intake and exhaust valves at positions where all of them are closed. Thus, the pumping loss at the time when the engine 12 is rotated to be driven in the aforementioned fuel-cut state is reduced, the engine brake force decreases, and the travel distance of coasting can be prolonged. The alternator 22 is connected to the crankshaft, and generates an electric power by being rotated as the crankshaft rotates, regardless of the stop of one, some or all of the cylinders.

The automatic transmission 16 is a multi-stage automatic transmission of a planetary gear type or the like in which a plurality of different gear stages with different speed ratios e are established depending on whether a plurality of hydraulic frictional engagement devices (clutches and brakes) are engaged or released. Shift control is performed by an electromagnetic oil pressure valve, an electromagnetic switching valve and the like, which are provided in an oil pressure control device 32. A clutch C1 functions as an input clutch of the automatic transmission 16, and is subjected to engagement/release control in the same manner by the oil pressure control device 32. This clutch C1 is equivalent to a disconnection/connection device that connects or disconnects the engine 12 and the wheels 20 to/from one another. As the aforementioned automatic transmission 16, a continuously variable transmission of a belt type or the like can also be used instead of a multi-stage automatic transmission.

The wheels 20 are equipped with the wheel brakes 34 respectively, and a braking force is generated in accordance with a brake operation force (a depression force) Brk of a brake pedal 40 that is operated through depression by the foot of the driver. The brake operation force Brk is equivalent to the brake requirement amount. In this embodiment of the invention, a brake hydraulic pressure is mechanically generated from a brake master cylinder 44 via a brake booster 42 in accordance with the brake operation force Brk. A brake force is basically generated by the brake hydraulic pressure, and the brake hydraulic pressure is regulated by the ABS device 46 according to need such that a slip of the wheels 20 is restrained. The brake booster 42 amplifies the brake operation force Brk through the use of a negative pressure generated through rotation of the engine 12. The brake hydraulic pressure that is output from the brake master cylinder 44 is amplified, and a large braking force is obtained. The brake pedal 40 is equivalent to the brake operation member.

The vehicular drive unit 10 configured as described above is equipped with an electronic control unit 50. The electronic control unit 50 is configured to include a so-called microcomputer having a CPU, a ROM, a RAM, input/output interfaces and the like, performs a signal processing in accordance with a program stored in advance in the ROM, utilizing a temporary storage function of the RAM. A signal indicating the brake operation force Brk is supplied to the electronic control unit 50 from a brake operation amount sensor 60, and a signal indicating the accelerator operation amount θacc is supplied to the electronic control unit 50 from an accelerator operation amount sensor 62. Besides, a signal indicating a rotational speed of the engine 12 (an engine rotational speed) NE is supplied to the electronic control unit 50 from an engine rotational speed sensor 64, and a signal indicating a gradient Φ of a road surface is supplied to the electronic control unit 50 from a road surface gradient sensor 66. The road surface gradient sensor 66 is an acceleration (G) sensor or the like, but the road surface gradient Φ can also be obtained through calculation from an output of the engine 12, a change in a vehicle speed V, or the like. Besides, a signal indicating a remaining state of charge SOC of the battery 24 is supplied to the electronic control unit 50. For example, a voltage value of the battery 24 is read as the remaining state of charge SOC, but it is also acceptable to calculate the remaining state of charge SOC from a charge/discharge amount. Moreover, various pieces of information necessary for various kinds of control are supplied to the electronic control unit 50.

The aforementioned electronic control unit 50 is functionally equipped with normal travelling portion 52, free-run coasting portion 54, neutral coasting portion 56, and travelling mode changeover control portion 58. The normal travelling portion 52, the free-run coasting portion 54, and the neutral coasting portion 56 are designed to execute three travelling modes shown in FIG. 2, respectively. The normal travelling portion 52 executes normal travelling. During normal travelling, the clutch C1 is engaged, and the vehicle travels (runs) in a motive power transmission state where the engine 12 and the wheels 20 are connected together via the automatic transmission 16. In addition to engine drive travelling during which the vehicle runs with the engine 12 operated in accordance with the accelerator operation amount θacc, engine brake travelling during which the engine 12 is rotated to be driven in accordance with the vehicle speed V in an idle state or in a fuel-cut (F/C) state where the supply of fuel is stopped is also possible. During engine brake travelling, all the cylinders of the engine 12 are rotated to be driven, so that relatively large engine brake is generated due to a pumping loss, a friction torque or the like. In this embodiment of the invention, fuel-cut (F/C) engine brake travelling during which the supply of fuel to the engine 12 is stopped under a certain condition is executed. This normal travelling is equivalent to engine connection travelling.

During the aforementioned normal travelling, the engine 12 is rotationally driven or rotated to be driven at a predetermined rotational speed. Therefore, an amplification effect of the brake operation force Brk by the brake booster 42 through the use of a negative pressure generated through rotation of the engine is appropriately obtained. "Supply of negative pressure" in FIG. 2 indicates whether or not a negative pressure is supplied to a negative pressure tank of the brake booster 42 (whether or not the negative pressure tank of the brake booster 42 is filled with a negative pressure). In the case of no negative pressure being supplied "x", the negative pressure in the negative pressure tank falls (approaches the atmospheric pressure) through repeated operation of the brake pedal 40, and the amplification effect of the brake operation force Brk deteriorates. Besides, during the aforementioned normal travelling, the alternator 22 is rotated as the engine 12 rotates, so that the battery 24 is charged.

The free-run coasting portion 54 executes free-run coasting in accordance with a predetermined execution condition such as a condition that the accelerator be OFF or the like. During free-run coasting, the clutch C1 is released to disconnect the engine 12 from the wheels 20, fuel-cut F/C is carried out to stop the supply of fuel to the engine 12, and the vehicle runs with the engine 12 stopped from rotating. In this case, the engine brake force is smaller than during the engine brake travelling, and is substantially 0 due to the release of the clutch C1. Therefore, the travel resistance becomes small, the travel distance resulting from coasting is prolonged, and the supply of fuel to the engine 12 is stopped. Therefore, a drastic improvement in fuel economy can be made. On the other hand, the engine 12 is stopped from rotating, and hence the amplification effect of the brake operation force Brk by the brake booster 42 through the use of a negative pressure generated through rotation of the engine deteriorates. Besides, the alternator 22 is also stopped from rotating as a result of the stop of rotation of the engine 12, so that the battery 24 cannot be charged. In this embodiment of the invention, this free-run coasting is executed as first coasting.

The neutral coasting portion 56 executes neutral coasting according to a predetermined execution condition such as a condition that the accelerator be OFF or the like. During neutral coasting, while the clutch C1 is released to disconnect the engine 12 from the wheels 20, the vehicle runs with the engine 12 supplied with fuel and operated in an idle state (autonomously rotated). In this case as well, the engine brake force is smaller than during the engine brake travelling, and is substantially 0 due to the release of the clutch C1. Therefore, the travel resistance becomes small, and the travel distance resulting from coasting is prolonged, so that an improvement in fuel economy can be made. The engine 12 is operated in an idle state, and hence fuel is consumed. However, the distance of coasting becomes longer and the frequency of re-acceleration becomes lower than during normal engine brake travelling during which the engine 12 is connected to the wheels 20. Therefore, an improvement in fuel economy is made as a whole. On the other hand, the engine 12 is rotated in an idle state. Therefore, the amplification effect of the brake operation force Brk by the brake booster 42 through the use of a negative pressure generated through rotation of the engine is appropriately obtained, and a vehicle braking force resulting from brake operation is secured. Besides, the alternator 22 is rotated as the engine rotates, so that the battery 24 is charged. In this embodiment of the invention, this neutral coasting is executed as second coasting.

Figures 2, 3:
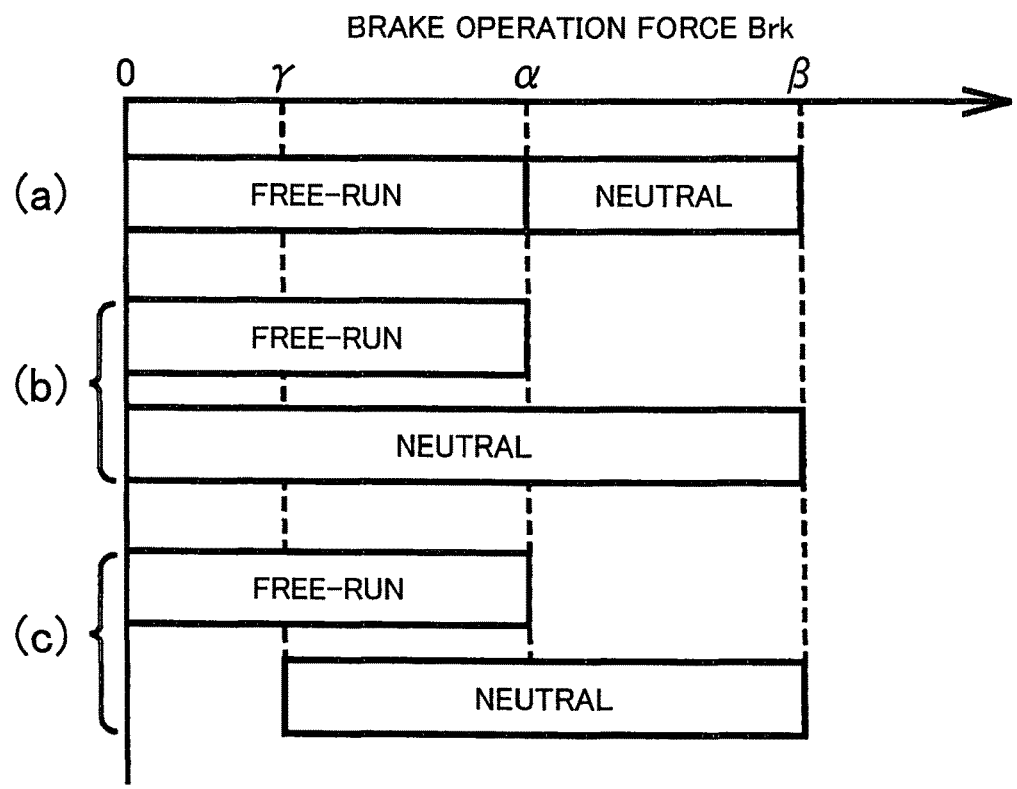
FIG. 2 is a view illustrating three travelling modes that are executed by the vehicular drive unit of FIG. 1.
FIG. 3 is a view illustrating the differences between execution ranges of free-run coasting and neutral coasting, which are executed by the vehicular drive unit of FIG. 1, for a brake operation force Brk.

The travelling mode changeover control portion 58 makes a changeover among three travelling modes, namely, the aforementioned normal travelling, the aforementioned free-run coasting, and the aforementioned neutral coasting. The travelling mode changeover control portion 58 changes over the brake operation force Brk in accordance with the classification of cases (execution conditions) shown in, for example, any one of cases (a) to (c) of FIG. 3. It is acceptable to determine this classification of the cases such that the brake operation force Brk is included, and it is also acceptable to start or end execution in accordance with a condition other than the brake operation force Brk. FIG. 3 shows execution start conditions of free-run coasting and neutral coasting with regard to the brake operation force Brk. In this embodiment of the invention, however, a changeover among the travelling modes is made according to the same condition as the execution start condition with regard to the brake operation force Brk, during the execution of this free-run coasting and this neutral coasting as well.

In the case (a) of FIG. 3, free-run coasting is executed if the brake operation force Brk is equal to or smaller than the first criterial value α including when the brake is OFF (not operated), neutral coasting is executed if the brake operation force Brk has exceeded the first criterial value α to become equal to or smaller than the second criterial value β, and F/C engine brake travelling is executed if the brake operation force Brk has exceeded the second criterial value β. The first criterial value α is an upper-limit at which the execution of free-run coasting is started. Free-run coasting is ended if the brake operation force Brk has exceeded this first criterial value α. Besides, the second criterial value β is an upper-limit at which the execution of neutral coasting is started. Neutral coasting is ended if the brake operation force Brk has exceeded this second criterial value β. The first criterial value α is smaller than the second criterial value β. In the case where the brake pedal 40 is operated through depression, free-run coasting is executed in a range where the brake operation force Brk is smaller than during neutral coasting. Incidentally, F/C engine brake travelling can be executed in a range where the brake operation force Brk is equal to or smaller than the second criterial value β as well. F/C engine brake travelling is executed if the execution thereof is possible even in a range equal to or smaller than the second criterial value β and the execution of coasting is impossible or inappropriate. The same holds true for the cases (b) and (c) of FIG. 3.

The case (b) is identical to the case (a) in that free-run coasting is executed if the brake operation force Brk is equal to or smaller than the first criterial value α including when the brake is OFF, but is different from the case (a) in that neutral coasting is executed if the brake operation force Brk is equal to or smaller than the second criterial value β including when the brake is OFF. In this case, free-run coasting and neutral coasting are executed according to the predetermined classification of cases if the brake operation force Brk is equal to or smaller than the first criterial value α. For example, during neutral coasting, an electric power can be generated by the alternator 22 through rotation of the engine 12. Therefore, for example, free-run coasting is restricted in accordance with the necessity of electric energy if the remaining state of charge SOC of the battery 24 is equal to or smaller than a predetermined amount etc., and neutral coasting is executed even if the brake operation force Brk is equal to or smaller than the first criterial value α. In this manner, various execution conditions can be set on the basis of a travelling state or a vehicle state. In this case, if the brake operation force Brk has exceeded the first criterial value α during the execution of free-run coasting at the time when the brake operation force Brk is equal to or smaller than the first criterial value α, it is desirable to make a changeover to neutral coasting. However, it is also acceptable to immediately make a recovery to normal travelling (F/C engine brake travelling).

The case (c) is substantially identical to the aforementioned case (b). However, a third criterial value γ as a lower-limit at which neutral coasting is executed is determined separately from the brake operation force Brk=0 at the time when the brake is OFF, and is set to a value that is smaller than the first criterial value α. In this case, it is acceptable to execute free-run coasting regardless of the remaining state of charge SOC of the battery 24 if the brake operation force Brk is smaller than the third criterial value γ, and to make a changeover to neutral coasting according to need if the brake operation force Brk becomes equal to or larger than the third criterial value γ. However, it is also acceptable to execute neutral coasting if the brake operation force Brk is equal to or larger than the third criterial value γ, without executing free-run coasting.

Figure 4:
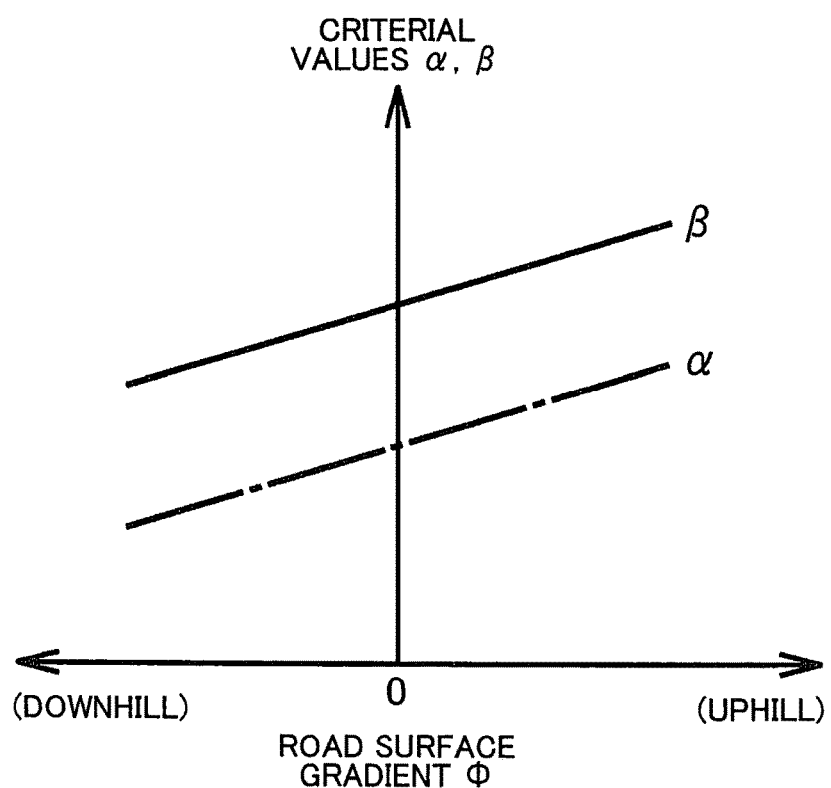
FIG. 4 is a view showing an example of a data map in setting criterial values α and β of FIG. 3 in accordance with a road surface gradient (101)

Constant values may be determined in advance as the aforementioned criterial values α and β, but it is also acceptable to set the aforementioned criterial values α and β using the road surface gradient Φ as a parameter as shown in, for example, FIG. 4. That is, a larger braking force is generally required on a downhill gradient with a negative road surface gradient than on a substantially horizontal flat road (Φ=≈0). Therefore, the criterial values α and β are made small, and a transition from free-run coasting to neutral coasting is made with the small brake operation force Brk, so that an amplification effect of the brake operation force Brk by the brake booster 42 is appropriately obtained. Alternatively, a recovery to normal travelling (F/C engine brake travelling) is made so that a large engine brake force is obtained. On the contrary, the requirement for the braking force is lower on an uphill gradient with a positive road surface gradient than on a substantially horizontal flat road (Φ≈0). Therefore, the criterial values α and β are set large, and the execution range of free-run coasting and neutral coasting is enlarged, so that a further improvement in fuel economy can be made. Such criterial values α and β are determined in advance according to a data map, an arithmetic expression or the like. It is also acceptable to set the criterial value γ using the road surface gradient Φ as a parameter, as is the case with the criterial values α and β.

Figure 5:
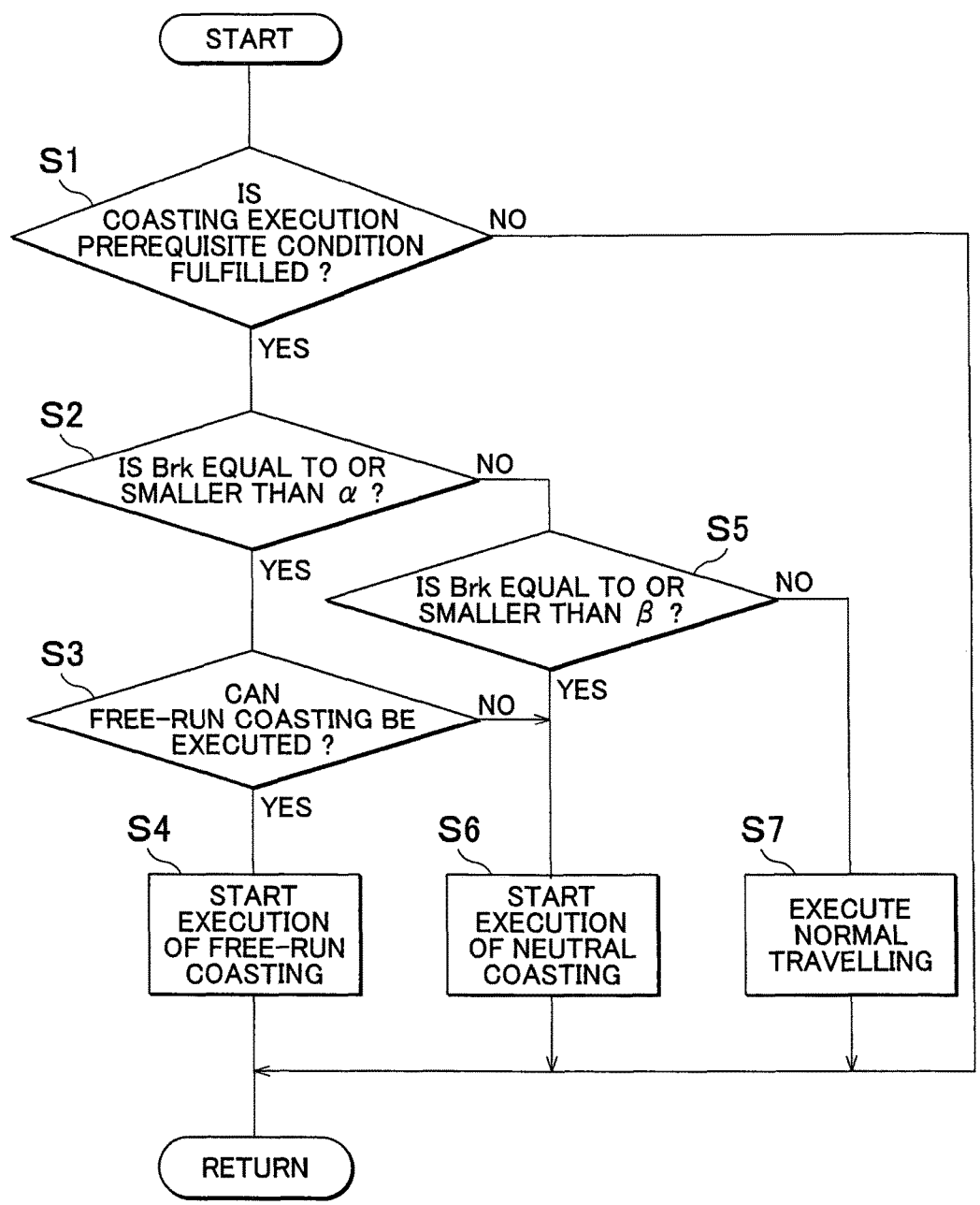
FIG. 5 is a flowchart illustrating the operation regarding a determination on the start of execution of coasting that is executed by an electronic control unit of FIG. 1.

FIG. 5 is a flowchart regarding the operation in making a determination on the start of execution of free-run coasting and neutral coasting by the aforementioned travelling mode changeover control portion 58. In step S1, it is determined whether or not a prerequisite condition for starting the execution of either free-run coasting or neutral coasting is fulfilled. The prerequisite condition is, for example, that the state of the accelerator being OFF (not operated) with the accelerator operation amount θacc substantially equal to 0 continue for a certain time or more. The steps starting from step S2 are executed if the prerequisite condition is fulfilled.

In step S2, it is determined whether or not the brake operation force Brk is equal to or smaller than the first criterial value α. The steps starting from step S5 are executed if Brk>α. However, step S3 is executed if Brk≤α. In step S3, it is determined, according to a predetermined execution possibility condition, whether or not free-run coasting can be executed (is appropriate). Then, if the execution possibility condition is fulfilled, the execution of free-run coasting is started in step S4. Besides, if the execution possibility condition is not fulfilled, step S6 is executed. This execution possibility condition is determined such that the execution of free-run coasting during which a charging effect of the battery 24 by the alternator 22 is not obtained is prohibited if the necessity of electric energy is high, for example, if the remaining state of charge SOC of the battery 24 is equal to or smaller than a predetermined amount, etc.

On the other hand, in step S5 that is executed if the result of the determination in the step S2 is NO (negative), namely, if the brake operation force Brk has exceeded the first criterial value α, it is determined whether or not the brake operation force Brk is equal to or smaller than the second criterial value β. Then, if Brk≤β, the execution of neutral coasting is started in step S6. If Brk>β, normal travelling is executed in step S7.

The aforementioned flowchart of FIG. 5 relates to a determination on the start of execution of coasting. However, even during the execution of free-run coasting or neutral coasting, steps similar to those starting from step S2 are executed as to the brake operation force Brk, and a changeover is appropriately made between free-run coasting and neutral coasting in accordance with a change in the brake operation force Brk. Besides, if the determination in step S3 is NO (negative) or if the determination in step S5 is YES (positive), the execution of neutral coasting is uniformly started in step S6. However, an execution possibility condition for determining whether or not this neutral coasting can be executed (is appropriate) is separately determined. It is also acceptable to start the execution of neutral coasting if the execution possibility condition is fulfilled, and execute normal travelling of step S7 if the execution possibility condition is not fulfilled.

Figure 6:
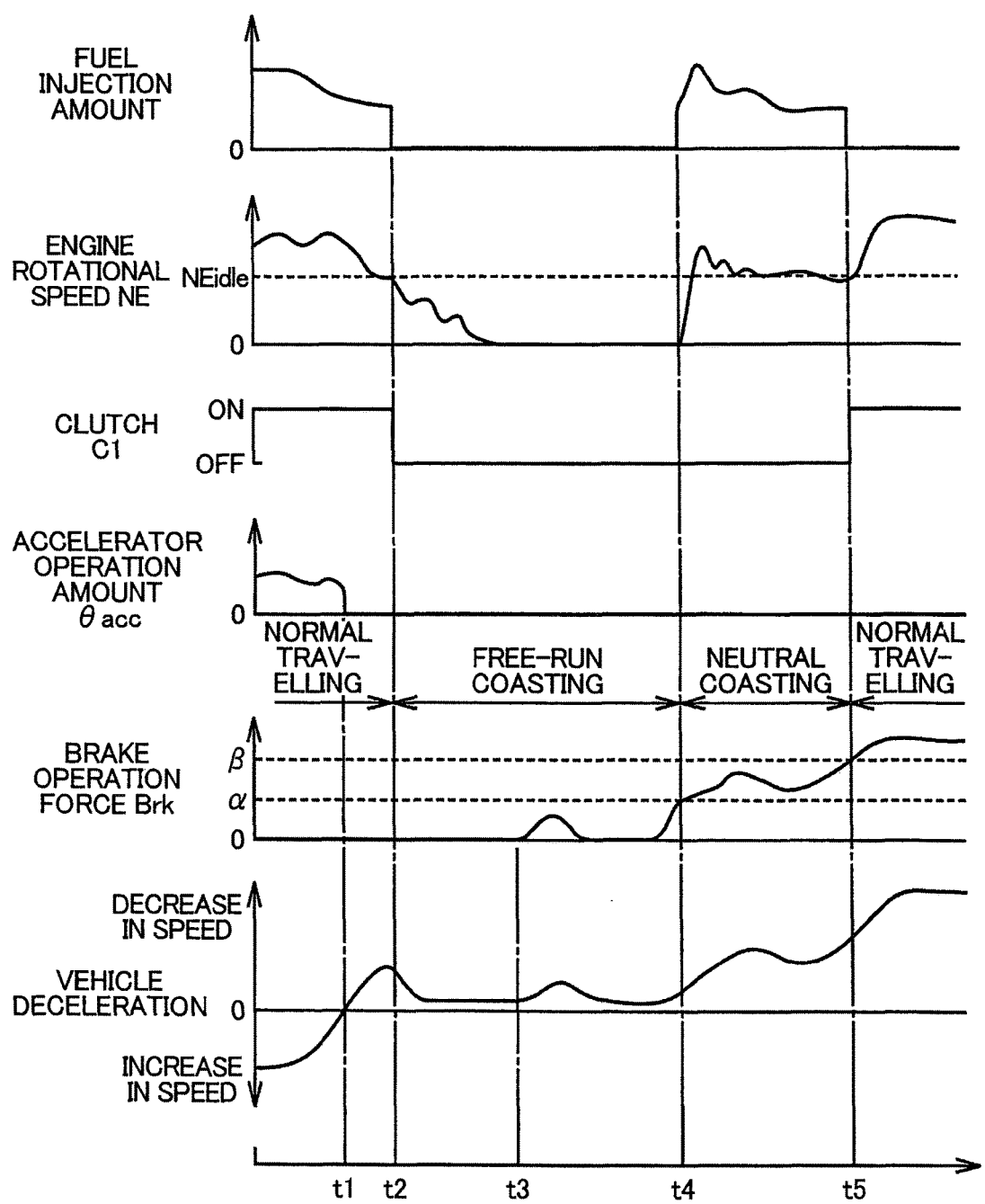
FIG. 6 is an example of a time chart showing changes in operation state of respective portions in a case where the execution of free-run coasting is started according to the flowchart of FIG. 5 and a changeover to neutral coasting and further to normal travelling is made as the brake operation force Brk changes.

FIG. 6 is an example of a time chart showing changes in the operation states of respective portions in the case where coasting is executed according to the aforementioned flowchart of FIG. 5, and any one of the cases (a) to (c) of FIG. 3 is possible. This FIG. 6 shows a case where the execution of free-run coasting is started if the brake operation force Brk is equal to or smaller than the first criterial value α. At a time t1, the accelerator is turned OFF. After the lapse of a certain time (at a time t2), all the results of the determinations in steps S1 to S3 are YES (positive). Step S4 is executed, the execution of free-run coasting is started, the clutch C1 is released (turned OFF), and the supply of fuel is stopped. After that, if brake operation is started at a time t3 and the brake operation force Brk exceeds the first criterial value α(at a time t4) during the execution of the free-run coasting, a transition to neutral coasting is made, fuel injection is resumed, and the engine 12 is operated in an idle state (autonomously rotated). Besides, if the brake operation force Brk further increases to exceed the second criterial value β (at a time t5) during the execution of the neutral coasting, a recovery to normal travelling is made, the clutch C1 is engaged (turned ON), and the supply of fuel is stopped, so that F/C engine brake travelling is executed.

FIG. 7 shows a case where brake operation is immediately performed subsequently to the turning OFF of the accelerator (at the time t1) and where the brake operation force Brk is larger than the first criterial value α and equal to or smaller than the second criterial value β when coasting is started at the time t2, and any one of the cases (a) to (c) of FIG. 3 is possible. In this case, the result of the determination in step S2 is NO (negative), and the result of the determination in step S5 is YES (positive). Therefore, step S6 is executed, the execution of neutral coasting is started, the clutch C1 is released (turned OFF), and the engine 12 is controlled to an idle state.

In this manner, in the vehicular drive unit 10 according to this embodiment of the invention, both free-run coasting during which the vehicle runs with the engine 12 stopped from rotating and neutral coasting during which the vehicle runs with the engine 12 allowed to rotate are executed as coasting. The execution of free-run coasting during which the vehicle runs with the engine 12 stopped from rotating is started on the condition that the brake operation force Brk be equal to or smaller than the first criterial value α. During this free-run coasting, the brake booster 42 cannot be filled with a negative pressure. However, since free-run coasting is executed only in a range where the brake operation force Brk assumes a relatively small value that is equal to or smaller than the first criterial value α. Therefore, the negative pressure of the brake booster 42 is restrained from falling. While a vehicle braking force resulting from brake operation is secured, free-run coasting is executed to stop the engine 12 from rotating until the brake operation force Brk reaches the first criterial value α. Thus, an excellent performance of making an improvement in fuel economy is obtained.

On the other hand, neutral coasting during which the vehicle runs with the engine 12 allowed to rotate is executed on the condition that the brake operation force Brk be equal to or smaller than the second criterial value β as a relatively large value. Therefore, an amplification effect of the brake force by the brake booster 42 through rotation of the engine is appropriately obtained. While a vehicle braking force resulting from brake operation is secured, more excellent fuel economy than during engine brake travelling is obtained.

That is, in consideration of the amplification effect of the braking force at the time of brake operation, there is provided a difference between the upper-limits (α and β) of the brake operation force Brk with which the execution of free-run coasting and neutral coasting is started, on the basis of whether or not the brake booster 42 can be filled with a negative pressure. Therefore, while a vehicle braking force resulting from brake operation is secured, the range of the brake operation force Brk where coasting is executed is enlarged, so that a further improvement in fuel economy can be made.

Besides, in this embodiment of the invention, F/C engine brake travelling during which a large engine brake force is obtained can be executed, including a range where the brake operation force Brk has exceeded the second criterial value β. F/C engine brake travelling is executed especially if the brake operation force Brk>β. Thus, a large engine brake force is obtained in addition to the amplification effect of the brake force by the brake booster 42, so that a large braking force is appropriately obtained through brake operation.

Besides, in this embodiment of the invention, both the first criterial value α and the second criterial value β are set smaller in the case of a downhill gradient than on a flat road (a substantially horizontal road surface). Therefore, the execution range of free-run coasting during which the brake booster 42 cannot be filled with a negative pressure becomes narrow, and the execution range of neutral coasting during which the engine brake force is small becomes narrow. The range of F/C engine brake travelling during which a large brake force is obtained is enlarged correspondingly. Therefore, a large vehicle braking force can be secured on a downhill gradient.

Besides, both the first criterial value α and the second criterial value β are set larger in the case of an uphill gradient than on a flat road (a substantially horizontal road surface), but the requirement for the braking force is relatively small on an uphill gradient. Therefore, while a vehicle braking force resulting from brake operation is secured, and the travel distance resulting from free-run coasting and neutral coasting becomes long, so that a further improvement in fuel economy is made.

Besides, as shown in FIG. 6, in the case where a transition to neutral coasting is made if the brake operation force Brk has exceeded the first criterial value α during the execution of free-run coasting, and a changeover to F/C engine brake travelling is made if the brake operation force Brk has exceeded the second criterial value β during the execution of neutral coasting, an amplification effect of a brake force by the brake booster 42 is obtained in accordance with the brake operation force Brk. Furthermore, a large engine brake force resulting from F/C engine brake travelling is obtained. Thus, while a vehicle braking force resulting from brake operation is appropriately secured, free-run coasting is executed if the brake operation force Brk is equal to or smaller than the first criterial value α, and neutral coasting is executed if the brake operation force Brk has exceeded the first criterial value α to become equal to or smaller than the second criterial value β. Thus, an excellent performance of making an improvement in fuel economy is obtained.

On the other hand, in this embodiment of the invention, the electric power of the battery 24 may be consumed due to the operation of the ABS device 46 even at the time of coasting in the case where the ABS device 46 is provided. In that case, since no electric power can be generated by the alternator 22 during free-run coasting, the remaining state of charge SOC decreases if the electric power of the battery 24 is consumed due to the operation of the ABS device 46. However, free-run coasting is executed only in a range where the brake operation force Brk assumes a relatively small value that is equal to or smaller than the first criterial value α. Therefore, the amount of decrease in the remaining state of charge SOC is small, and the battery 24 is restrained from deteriorating as a result of a change in the remaining state of charge SOC. Incidentally, the engine 12 is rotated during neutral coasting or F/C engine brake travelling, and the battery 24 is charged through the generation of electric power by the alternator 22. Therefore, the decrease in the remaining state of charge SOC of the battery 24 does not cause any problem, regardless of the consumption of the electric power resulting from the operation of the ABS device 46.

Next, the other embodiment of the invention will be described. In the foregoing embodiment of the invention, neutral coasting is executed as second coasting. However, as shown in FIG. 8, it is also acceptable to execute cylinder stop coasting instead of the neutral coasting. That is, cylinder stop coasting portion is provided instead of the neutral coasting portion 56, so that cylinder stop coasting is executed. During cylinder stop coasting, while the clutch C1 is held engaged to keep the engine 12 and the wheels 20 connected together, the engine 12 is stopped from being supplied with fuel (fuel cut F/C), and is stopped by a cylinder stop device of the engine control device 30 at a position where all the intake and exhaust valves of one or some (e.g., a half) of the plurality of the cylinders are closed. In this case, the crankshaft is rotated to be driven in accordance with the vehicle speed V or the gear stage of the automatic transmission 16, but the intake and exhaust valves are stopped in their closed states. Therefore, the loss resulting from the pumping effect is smaller in comparison with a case where the intake and exhaust valves are opened/closed in synchronization with the crankshaft, and the engine brake force is made smaller than during engine brake travelling. Thus, the travel distance resulting from coasting becomes long, and an improvement in fuel economy is made. Besides, only one or some of the plurality of the cylinders are stopped, and the intake and exhaust valves are opened/closed in synchronization with the crankshaft in the remaining cylinders or the remaining cylinder. Therefore, the brake booster 42 is supplied with a negative pressure due to the pumping effect resulting from the cylinders or the cylinder, and an amplification effect of the brake operation force Brk is obtained. Besides, the alternator 22 is rotated as the crankshaft is rotated, regardless of the stop of the cylinder or the cylinders. Therefore, the battery 24 is charged.

Accordingly, the engine brake force is larger than during the neutral coasting, and the travel distance resulting from coasting becomes relatively short. However, the engine 12 is stopped from being supplied with fuel, and is simply rotated to be driven. Therefore, the same efficiency as during neutral coasting or a higher efficiency than during neutral coasting is obtained as fuel economy. Besides, only one or some of the cylinders are stopped, and a negative pressure is generated through a pumping effect as to the remaining cylinders or the remaining cylinder, and an amplification effect of the brake operation force Brk by the brake booster 42 is obtained as is the case with neutral coasting. Thus, even if cylinder stop coasting is executed instead of neutral coasting in the foregoing embodiment of the invention, an operation and an effect similar to those of the foregoing embodiment of the invention are obtained. In that case, when a transition is made from free-run coasting to cylinder stop coasting, it is acceptable to engage the clutch C1 so that the engine 12 is rotated to be driven, and to stop the intake and exhaust valves of one or some of the cylinders at their closed positions by the cylinder stop device. Besides, when a recovery is made from cylinder stop coasting to F/C engine brake travelling, it is acceptable to cancel the stop of the intake and exhaust valves by the cylinder stop device, and to connect the intake and exhaust valves to the crankshaft such that the intake and exhaust valves are driven to be opened/closed.

The second criterial value β as an upper-limit of the brake operation force Brk with which the execution of the aforementioned cylinder stop coasting is started may be the same as in the foregoing embodiment of the invention, but may be set as a different value. Besides, as second coasting, it is also acceptable to ensure that both neutral coasting and cylinder stop coasting are executed according to the classification of cases.

The embodiments of the invention have been described above in detail on the basis of the drawings. However, these are nothing more than embodiments of the invention, and the invention can be implemented after being modified and improved in various manners on the basis of the knowledge of those skilled in the art.

The invention claimed is:

1. A control device for a vehicle including an engine, a brake operation member that is operated on a basis of a driver's brake requirement amount, and a brake booster that amplifies a brake force with use of a negative pressure generated through rotation of the engine, the control device comprising:
   a controller configured to control the vehicle to:
      execute engine brake travelling so as to travel with engine brake effectuated by connecting the engine to a wheel so that the engine is drivingly rotated through rotation of the wheel,
      execute first coasting when the brake requirement amount is equal to or smaller than a predetermined first criterial value,
      execute second coasting when the brake requirement amount is equal to or smaller than a predetermined second criterial value that is larger than the first criterial value,
      set an engine brake force during the first coasting and the second coasting smaller than an engine brake force during the engine brake travelling,
      stop the engine and cause the vehicle to travel during the first coasting, and
      rotate the engine and cause the vehicle to travel during the second coasting,
   wherein
      the controller is configured to set the first criterial value and the second criterial value in accordance with a gradient of a road surface, and
      the controller is configured to set the first criterial value and the second criterial value in a case where the road surface is a downhill gradient smaller than the first criterial value and the second criterial value in a case where the road surface is a flat road, respectively.

2. A control device for a vehicle including an engine, a brake operation member that is operated on a basis of a driver's brake requirement amount, and a brake booster that amplifies a brake force with use of a negative pressure generated through rotation of the engine, the control device comprising:
   a controller configured to control the vehicle to:
      execute engine brake travelling so as to travel with engine brake effectuated by connecting the engine to a wheel so that the engine is drivingly rotated through rotation of the wheel, execute first coasting when the brake requirement amount is equal to or smaller than a predetermined first criterial value, execute second coasting when the brake requirement amount is equal to or smaller than a predetermined second criterial value that is larger than the first criterial value, set an engine brake force during the first coasting and the second coasting smaller than an engine brake force during the engine brake travelling, stop the engine and cause the vehicle to travel during the first coasting, and rotate the engine and cause the vehicle to travel during the second coasting, wherein the controller is configured to set the first criterial value and the second criterial value in accordance with a gradient of a road surface, and the controller is configured to set the first criterial value and the second criterial value in a case where the road surface is an uphill gradient larger than the first criterial value and the second criterial value in a case where the road surface is a flat road, respectively.

3. A control device for a vehicle including an engine, a brake operation member that is operated on a basis of a driver's brake requirement amount, and a brake booster that amplifies a brake force with use of a negative pressure generated through rotation of the engine, the control device comprising:

a controller configured to control the vehicle to:

execute engine brake travelling so as to travel with engine brake effectuated by connecting the engine to a wheel so that the engine is drivingly rotated through rotation of the wheel, execute first coasting when the brake requirement amount is equal to or smaller than a predetermined first criterial value, execute second coasting when the brake requirement amount is equal to or smaller than a predetermined second criterial value that is larger than the first criterial value, set an engine brake force during the first coasting and the second coasting smaller than an engine brake force during the engine brake travelling, stop the engine and cause the vehicle to travel during the first coasting, and rotate the engine and cause the vehicle to travel during the second coasting, wherein the controller is configured to make a transition to the second coasting when the brake requirement amount has exceeded the first criterial value during execution of the first coasting, and the controller is configured to make a transition to the engine brake travelling when the brake requirement amount has exceeded the second criterial value during execution of the second coasting.

4. A control device for a vehicle including an engine, a brake operation member that is operated on a basis of a driver's brake requirement amount, and a brake booster that amplifies a brake force with use of a negative pressure generated through rotation of the engine, the control device comprising:

a controller configured to control the vehicle to:

execute engine brake travelling so as to travel with engine brake effectuated by connecting the engine to a wheel so that the engine is drivingly rotated through rotation of the wheel, execute first coasting when the brake requirement amount is equal to or smaller than a predetermined first criterial value, execute second coasting when the brake requirement amount is equal to or smaller than a predetermined second criterial value that is larger than the first criterial value, set an engine brake force during the first coasting and the second coasting smaller than an engine brake force during the engine brake travelling, stop the engine and cause the vehicle to travel during the first coasting, and rotate the engine and cause the vehicle to travel during the second coasting, wherein the first coasting is coasting during which the engine is disconnected from the wheel and fuel is stopped from being supplied to the engine such that the engine is stopped, and the second coasting is coasting during which the engine and the wheel are connected to each other, fuel is stopped from being supplied to the engine, and at least one of operation of a piston or pistons and operation of intake and exhaust valves in at least one of a plurality of cylinders of the engine is stopped.

* * * * *